United States Patent Office 3,565,798
Patented Feb. 23, 1971

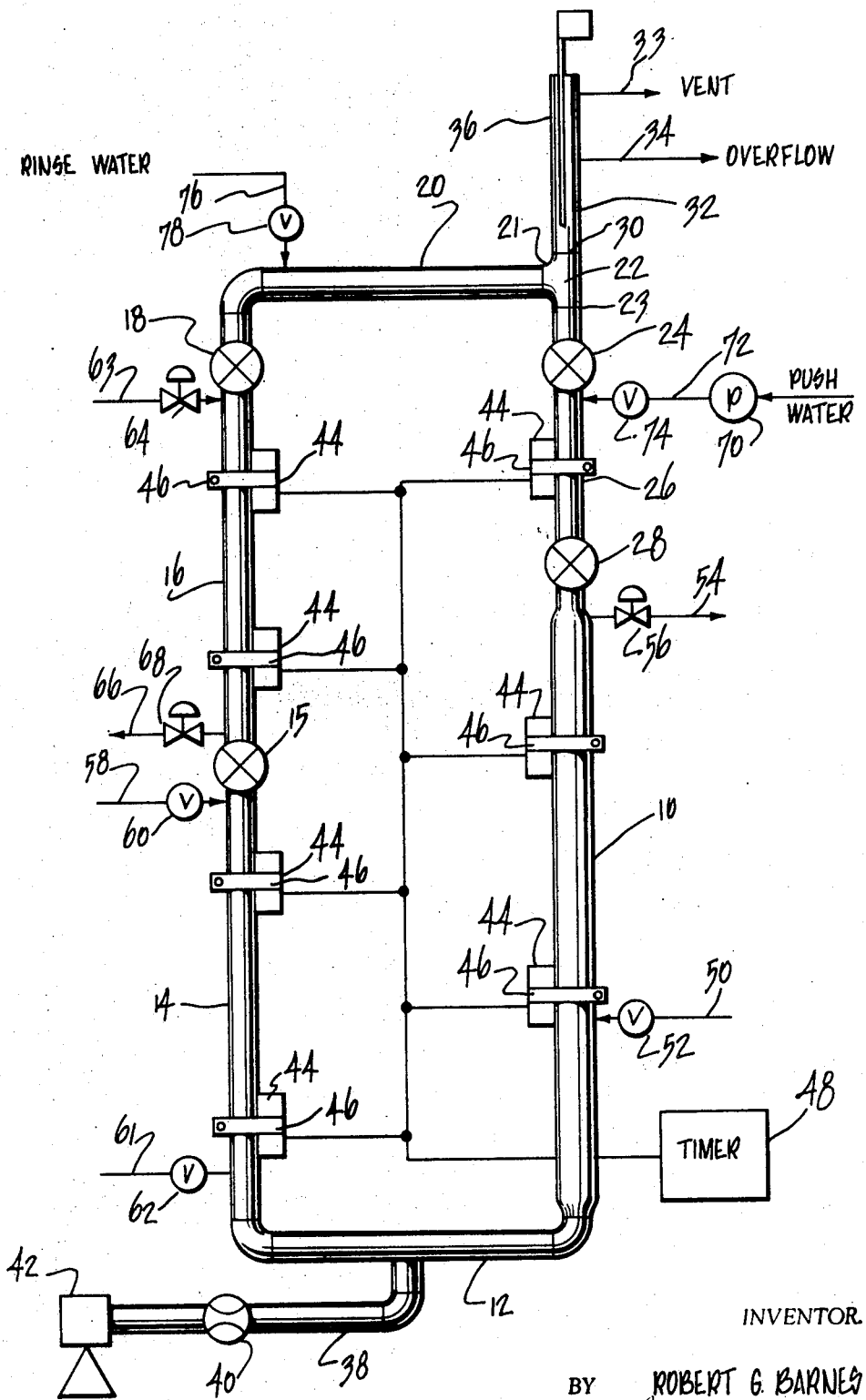

3,565,798
ION EXCHANGE RESIN CONTACTOR
Robert G. Barnes, Saratoga, Calif., assignor to General
Electric Company, a corporation of New York
Filed Nov. 2, 1967, Ser. No. 680,234
Int. Cl. B01d 15/02, 35/20
U.S. Cl. 210—19
11 Claims

ABSTRACT OF THE DISCLOSURE

An improved semi-continuous ion exchange system is disclosed. In this system, ion exchange resin particles are moved through the contactor by push water while the contactor is subjected to vibration.

BACKGROUND OF THE INVENTION

This invention relates to ion exchange resin apparatus and methods for separating a first component from a mixture with one or more other components.

Ion exchange resins are well known, and are used in many different types of processes for separating one component from a system which contains one or more other components. The operation of an ion exchange resin depends on its ability to adsorb one component more strongly from a system than other components which may be present. The zeolite process for softening hard water is a well-known example of ion exchange resin treatment. In the zeolite process, hard water with hardness-imparting ions, such as calcium and magnesium, is passed through a zeolite bed where the calcium and magnesium ions are adsorbed from the water and replaced with sodium ions which do not impart hardness to the water. Once the zeolite bed is saturated with the hardness-imparting ions, it is regenerated by flushing it with a concentrated solution of sodium chloride so that the adsorbed calcium and magnesium ions are driven off and replaced by the more numerous sodium ions. The bed is now ready to soften additional hard water.

Certain resins, such as styrene polymerized with divinylbenzene and thereafter sulfonated, are produced in a finely-divided form, such as small spheres, and have the properties of thermosetting resins with temperature stability and essentially complete insolubility in most solvents. Resins of this type are produced with characteristics to cause ion exchange in various ways.

One problem with ion exchange resins is that after they are saturated with the component to be removed, the resins have to be regenerated. This requires interrupting the process, which is often time-consuming and expensive.

In the past, a fixed bed of plastic particulate resin exchange material has been used in a cyclic manner with alternate loading and unloading or elution. Later, continuously-operating exchange devices were used such as disclosed in U.S. Pat. No. 2,572,848. These prior devices have several disadvantages. The first is slow and requires two beds operating on a staggered cycle to keep production at a high level. In the second method, throughput per unit of cross-sectional area is lower per device than with the fixed bed.

U.S. Pat. No. 2,815,322 attempts to solve the aforementioned problems by providing a device in which a bed of solid exchange resin particles is operated substantially as a fixed bed but is moved periodically to transfer portions of the particulate material to an elution position. The system disclosed in U.S. Pat. No. 2,815,322 solves some of the problems of the prior-art devices, but is subject to the disadvantage that the ion exchange resin must be moved periodically through the container. The movement of the resin subjects it to mechanical abrasion, and shortens its life.

An important use of ion exchange resins is the chemical reprocessing of highly-radioactive plutonium-containing uranium power reactor fuel. In treating such material, it is imperative that the ion exchange resin column be capable of a high decontamination efficiency, and have a relatively long operating life to reduce the operating inconvenience and hazard of having to replace the resin at relatively short intervals.

Use of ion exchange resin to separate radioactive materials subjects the resin to severe attack from chemicals and radiation. These two factors aggravate the mechanical abrasion to which the resin is subjected as it is moved through the container holding it. The ion exchange resin softens under the chemical and radiolytic attack and eventually deforms so readily under pressure that it must be replaced when resin movement becomes increasingly unreliable. An added problem in moving the resin is the slippage of the motive fluid through the resin column, causing reverse flow of the process solutions. This reverse flow reduces the operating efficiency of the ion exchange unit, and requires the use of additional process reagents.

Thus, there is a continuing need for improved ion exchange system.

SUMMARY OF THE INVENTION

It is, therefore, an object of this invention to provide an ion exchange system overcoming the above problems.

Another object of this invention is to provide a semi-continuous ion exchange system having improved resin movement reliability.

Another object of this invention is to provide a semi-continuous ion exchange system capable of effectively using softer resins.

Still another object of this invention is to provide a semi-continuous ion exchange system in which slippage of the motive fluid is substantially reduced.

The foregoing objects and others are accomplished in acordance with this invention by mounting mechanical vibrators on the walls of the ion exchange resin container to vibrate the container during resin movement, to reduce friction between the resin particles and the container walls during resin movement. This has been found to permit reliable resin movement at differential pressures low enough to avoid excessive compaction of the resin mass and to prevent abrasion and deformation damage to the resin particles.

In terms of apparatus, the invention includes an elongated vessel, and conduit means connecting one end of the vessel with the other to form an endless loop adapted to hold a column of ion exchange resin. Valves are provided for adding feed liquid to the loop at a first point and removing it from the loop at a second point. Means are also provided for adding an eluant to the loop at a third point and removing it from the loop at a fourth point. Means are provided for moving the ion exchange resin around the loop, and means are also provided for vibrating the loop to facilitate the movement of the resin through it.

In a preferred embodiment, the resin is moved by pushing it with a fluid such as water. The resin loop is vibrated when the resin is being moved through the loop. Preferably, a timer is connected to appropriate electric circuits which automatically open and close valves to cycle the resin and various fluids through the loop and energize the vibrator during the period of resin movement.

Preferably, one or more mechanical vibrators are clamped to the exterior of the loop so that they can easily be installed or removed remotely.

In terms of method, the invention includes steps of disposing a bed of ion exchange resin in a container, and thereafter flowing a fluid through a first part of a bed in a first portion of the container. The bed is thereafter vibrated while the first part of the bed is moved to a second portion of the container. Adsorbed material is eluted from the first part of the bed in the second portion of the container so that the first part of the bed is now ready for additional ion exchange.

DESCRIPTION OF THE DRAWING

These and other aspects of the invention will be more fully understood from the accompanying drawing, which is a schematic diagram showing a preferred embodiment of the system of the invention.

Referring to the drawing, a vertical adsorption pipe 10 is connected at its lower end by a connector 12 to the lower end of a vertical scrub pipe 14. A scrub pipe valve 15 connects the upper end of the scrub pipe with the lower end of a vertical elution pipe 16, the upper end of which is connected tthrough an elution pipe valve 18 to one end of a rinse pipe 20, the other end of which its connected to a first leg 21 of a T joint 22. A second leg 23 of the T joint is connected through a reservoir valve 24 to the upper end of a vertical reservoir pipe 26. An adsorption pipe valve 28 connects the lower end of reservoir pipe 26 to the upper end of adsorption pipe 10 to complete an endless loop adapted to hold a bed of ion exchange resin (not shown).

A third leg 30 of the T joint 22 is connected to the lower end of a vertical overflow pipe 32, the upper end of which is opened to atmosphere through a vent pipe 33, and the intermediate portion of which is connected to an overflow line 34.

A resin level probe rod 36 extends from the upper end of the overflow pipe down into that pipe to sense the level of resin within the pipe. The probe has a pair of vertically-spaced contacts (not shown) on its lower end. An electrical voltage is applied to the two probes through wires (not shown) connected to the contacts, and the resistivity of the material between the two probes is sensed to determine resin level. The resin is a good insulator so that the resistivity indicated by the probe shows a sharp change as the probe contacts move into or out of contact with the resin. Ordinarily, that portion of the overflow pipe which does not contain resin is filled with a liquid which is a relatively good conductor of electricity, for example, an aqueous solution of nitric acid.

A dump line 38 is connected to the intermediate portion of connector 12. Resin is dumped from the closed loop when required by opening a dump valve 40 in the dump line 38. A water-operated eductor 42 is connected to the side of the dump valve 40 opposite from dump line 38 to facilitate withdrawal of resin from the loop.

A plurality of mechanical vibrators 44 are connected by clamps 46 to the exterior of the various pipes which make up the endless loop which holds the resin. The clamps are conventional type which can be attached or disconnected remotely, and are operated from a timer 48.

Fluid to be subjected to ion exchange treatment in the apparatus is added through a feed line 50 and an open feed line valve 52 connected to a lower portion of the adsorption pipe 10. During this time, adsorption valve pipe 28, scrub pipe valve 15, elution pipe valve 18, and dump valve 40 are closed.

The fluid introduced through the feed line flows up through the bed of resin in the adsorption pipe and leaves the adsorption pipe through a raffinate line 54 and a raffinate valve 56 connected to the adsorption pipe just below adsorption pipe valve 28.

While fluid is introduced into the adsorption pipe, a scrubbing fluid is introduced to the top of the scrub pipe through a scrub inlet line 58 and a scrub inlet valve 60 connected to the upper end of the scrub line just below scrub valve 15. The scrub liquid flows down through the bed of resin in the scrub pipe and displaces feed fluid which may have been present in the resin that was moved from the adsorption pipe into the scrub pipe in a manner described in detail below. Scrub liquid flows out a scrub outlet line 61 connected to the lower part of the scrub pipe 14. A scrub outlet valve 62 in the scrub outlet line is open during the scrubbing operation. Used scrub liquid may be discarded or combined with the material from raffinate line 54.

At the same time that feed fluid is being introduced into the adsorption pipe and scrub liquid is passed through the scrub pipe, an eluant is passed down through the resin in the elution pipe by adding eluant through an eluant line 63 and eluant valve 64 connected to the upper end of the elution pipe just below elution pipe valve 18. The eluant flows down through the resin in the elution pipe and elutes of strips adsorbed material from the resin. The eluant and stripped material are recovered as a product through a product line 66 and a product valve 68 connected to the lower end of the elution pipe just above the scrub pipe valve 15.

After the resin in the adsorption pipe just above the feed line 50 is virtually saturated with adsorbed material, feed line valve 52, raffinate line valve 56, scrub inlet and outlet valves 60 and 62, eluant line valve 64, and product line valve 68 are closed. Reservoir valve 24 at the upper end of the reservoir pipe 26 is closed, and adsorption pipe valve 28 scrub pipe valve 15, and elution pipe valve 18 are opened. A push fluid such as water, is added to the upper end of the reservoir pipe by a pump 70 connected to a push line 72 which is connected through a push line valve 74 to the upper end of the reservoir pipe just below the reservoir valve 24. The reservoir pipe 26 is full of fresh resin, some of which is to move down and displace saturated resin from the lower end of the adsorption pipe. The timer turns on the vibrators 44 so that the pipes in the loop are vibrated at a fairly high frequency such as sixty cycles per second, to loosen the resin and decrease friction between the resin and the interior walls of the pipes and the loop. Preferably, the vibrators are turned on just before the application of the push fluid to relieve resin compaction against the pipe walls that has resulted from normal process flow. Sufficient push water is supplied by the pump to force the resin to move in a clockwise direction (as viewed in the drawing) so that the portion of the resin which is substantially saturated with the material being adsorbed is forced toward the scrub pipe. Resin in the scrub pipe, elution pipe, and rinse pipe is forced upwardly, and the resin in the rinse pipe is forced up into the overflow pipe.

If necesary or desired, the resin in the overflow pipe is rinsed by adding water or other suitable fluid through a rinse line 76 connected through a rinse line valve 78 which is connected to the rinse pipe 20. During the rinsing operation, any fines or other impurities are washed out of the resin and carried by the rinse fluid out through the overflow line 34 connected to the upper portion of the overflow pipe 32.

To restore the loop to its normal operation, adsorption pipe valve 28, scrub pipe valve 15, and elution pipe valve 18 are closed. Reservoir valve 24 is opened so that fresh resin in the overflow pipe can feed by gravity down into the upper portion of the reservoir pipe from which resin has been forced by the push water. After the reservoir pipe is filled, push valve 24 can be closed, or it can be left open until time for the next push cycle.

The adsorption, scrubbing, and elution cycles are then repeated as previously described by opening the appropriate valves in the various lateral lines feeding into and away from the loop. Although not specifically shown, the timer can be connected to solenoids which automatically operate the various valves at the required times to perform the various functions just described.

The processes and apparatus of this invention are especially well suited for treating spent fuel from nuclear reactors. Nuclear chain fission reactions and the reactors in which such reactions are accomplished are now well known. In general, a nuclear reactor is made up of a chain reacting assembly including nuclear fuel contained in fuel elements.

The nuclear fuel material contains fissionable atoms such as U–233, U–235, Pu–239, or Pu–241. Upon absorption of a neutron by the nucleus by such a fissionable atom, a nuclear disintegration frequency results. This produces on the average two fission product atoms of lower atomic weight and of great kinetic energy. The kinetic energy of the fission products as well as that of the fission neutrons is quickly dissipated, producing heat in the fuel elements of the reactor. The fissionable atoms are thus gradually consumed. Some of the fission products produced are strong neutron absorbers (fission product poisons). Thus, the fission reaction tends to decrease and cannot be maintained indefinitely at a given level.

The spent or irradiated reactor fuel removed from the reactor ordinarily contains a valuable quantity of the original fissionable material. It will contain also a significant quantity of fissionable material converted from any fertile component of the original fuel. Spent fuel also may contain fission product or transuranic isotopes (or both) which are of substantial value. Accordingly, it is highly desirable to reprocess the fuel material to recover and separate these materials for reuse. Such reuse of uranium and plutonium as a practical matter requires a high degree of fission product removal to reduce radioactivity and permit direct handling. Fission product separation or "decontamination" sufficient to reduce the product radioactivity to on the order of $10^{-7}$ to $10^{-8}$ of its original value is required. Such reductions are said to involve "decontamination factors" of $10^7$ or $10^8$, respectively. This invention provides improvements in the decontamination factors required for processing spent fuels.

In a typical run separating uranium and plutonium from an irradiated fuel element, the uranium and plutonium are put into an aqueous acid solution by contacting the spent fuel with a strong mineral acid, such s nitric acid.

The aqueous acid solution of the uranium, plutonium, and fission product values are fed into the adsorption pipe through feed line 50 and feed line valve 52. The mixture flows up the adsorption pipe, and substantially all the plutonium is adsorbed on the resin so that the raffinate which leaves the top of the adsorption pipe through raffinate line 54 and raffinate line valve 56 contains only uranium and the fission products. The resin may be of any suitable type. Preferably, it is an anion exchange resin which may be polystyrene beads coated with a strong base quaternary amine and sold under the trade name "Dowex–1" or "Permutit SK."

After sufficient feed is introduced into the adsorption pipe to saturate the lower part of the resin in the adsorption pipe, valves 52 and 56 are closed. Reservoir valve 24 is closed, adsorption pipe valve 28, scrub pipe valve 15, and elution pipe valve 18 are opened. Push water line valve 74 is opened and then push water, which preferably contains some nitric acid so that the push water can be either dilute or concentrated nitric acid solution, is forced by push pump 70 into the reservoir pipe 26. Just prior to the time push water is applied under pressure to the loop, the timer 48 turns on the vibrators 44 to vibrate the various pipes and valves in the loop and decrease wall friction between the resin and the pipes. The push water displaces fresh or regenerated resin from the reservoir pipe into the upper end of the adsorption pipe. Sufficient push water is applied to force the resin in the loop in a clockwise direction (as viewed in the drawing) for a distance until the saturated part of the resin is displaced from the lower end of the adsorption pipe. The vibrators are kept on during the pushing of the resin, and are turned off after the resin is moved the required distance. The resin in the scrub pipe, elution pipe, and rinse pipe advance to deposit a volume of resin in the overflow pipe equal to that displaced from the reservoir pipe.

Reservoir valve 24 is opened to let fresh resin from the overflow pipe drop down into the upper end of the reservoir pipe to replace the resin previously displaced by the push water. Adsorption valve 28, scrub valve 15, and elution valve 18 are during this period closed. Scrub liquid preferably seven molar nitric acid, is at the same time added to the top of scrub pipe 14 through scrub line 58 and scrub line valve 60 which is now opened. Sufficient scrub liquid is added to the scrub pipe 14 to flush out of the resin any feed liquid which might be present in the liquid displaced from the adsorption pipe into the scrub pipe. This prevents carry out of uranium and fission products with the resin on which the plutonium is adsorbed. Raffinate valve 56 is opened during the scrubbing operation to permit scrub liquid to flow through the resin. Scrub line valve 60 is now closed, and the valves 52 and 56 are opened so that additional feed can be circulated past the resin in the adsorption pipe.

The foregoing cycle is repeated until a resin which contains adsorbed plutonium is displaced into the elution pipe 16. A suitable eluant, preferably .75 molar nitric acid, is added to the top of the elution pipe through elution line 63 and elution line valve 64. The eluant flows down through the elution pipe, stripping adsorbed plutonium from the resin. The eluant and plutonium product leave the lower end of the elution pipe through product line 66 and open product line valve 68. The .75 molar nitric acid in the eluant helps prevent the plutonium from polymerizing. These individual adsorption, scrubbing and elution operations are, of course, performed simultaneously.

As the resin is cycled through the loop, it is subjected to wear due to abrasion against the loop walls, against itself, and due to action of the valves. There is also deterioration due to chemical action and irradiation from the radioactive materials in the feed being treated. The resulting detritus is removed as required by flowing rinse water in through rinse water line 76 and open rinse water line valve 79. The rinse water flushes through the resin in the rinse pipe and in the overflow pipe, and carries fines and other detritus out through the overflow line 34 in the overflow pipe. In this way, the resin is kept from being plugged by fine particles.

For application in radioactive service such as that just described, the vibrators are small remotely-replaceable units attached to fittings on the exterior of the loop walls. The intermittent operation and absence of moving parts assures reasonably long vibrator life despite an adverse environment.

In a typical operation such as that just described, the valves in the loop are closed approximately eighteen minutes in a twenty-minute cycle. The shifting of the resin and reloading fresh resin into the reservoir pipe takes approximately two minutes.

The use of the vibrators during the resin movement provides several advantages. The reliability of resin movement is enhanced. Due to the vibrators, the resin moves promptly when push water is applied, and it also aids in refilling the reservoir pipe when push valve 24 is open to drop fresh resin down from the overflow pipe into the upper end of the reservoir pipe. Since wall friction between the resin and the walls of the loop is largely eliminated, it is possible to move softer resin for a much longer time, thereby extending the effective life. This not only means the resin can be used longer, resulting in less resin consumption, but the resin need be replaced less often, resulting in longer periods of operation of the equipment. Slippage of the push fluid is greatly reduced by the vibrators, thus reducing the amount of reagents required.

The vibrators are actuated by the cycle timer and are operated only during the resin movement cycle. This is approximately five percent of the operating cycle. A portion of the vibrator operation may take place before the application of push fluid to relieve resin compaction against the loop walls that is incurred as the result of normal process flow.

While in the above description of a preferred embodiment certain specific materials and structural arrangement were described, these may be varied within the scope of this invention with similar results.

What is claimed is:

1. Ion exchange apparatus comprising an elongated vessel, in the form of an endless loop adapted to hold a quantity of ion exchange resin, means for adding feed liquid to the loop at a first point and removing it from the loop at a second point, means for adding an eluant to the loop at a third point and removing it from the loop at a fourth point, means for moving the ion exchange resin around the loop, and vibrator means adapted to vibrate the loop to facilitate movement of the resin through it.

2. Apparatus according to claim 1 which includes means for adding a push fluid to the vessel to force the resin to move from the first point in the loop toward the fourth point.

3. Apparatus according to claim 1 which includes means for operating said vibrating means intermittently.

4. Apparatus according to claim 1 in which the vibrators are electrically operated, and a timer is connected to the electrically-operated vibrators to actuate them intermittently.

5. Apparatus according to claim 1 in which the means for vibrating the loop are mechanical vibrators, and including clamps securing the mechanical vibrators to the exterior of the endless loop.

6. The method of conducting ion exchange with a fluid, the method including disposing a bed of ion exchange resin in a container, flowing the fluid through a first part of the bed in a first portion of the container, vibrating the bed of resin and moving the first part of the bed of resin to a second portion of the container, and eluting absorbed material from the first part of the bed in the second portion of the container.

7. The method according to claim 6 which includes the step of intermittently vibrating the bed of resin.

8. The method according to claim 6 which includes the step of vibrating the bed of resin prior to moving the first part of the bed to the second portion of the container, and continuing to vibrate the bed of resin as the first part of the bed of resin is moved to the second portion of the container.

9. The method according to claim 6 which includes the step of moving the first part of the bed of resin to the second portion of the container by pushing the resin bed with a fluid.

10. The method according to claim 9 in which the fluid for pushing the bed of resin is water.

11. The method according to claim 9 in which the fluid for pushing the bed of resin is an aqueous solution of acid.

References Cited
UNITED STATES PATENTS

| | | | |
|---|---|---|---|
| 2,815,322 | 12/1957 | Higgens | 210—33 |
| 3,056,743 | 10/1962 | Eichhorn et al. | 210—33 |

SAMIH N. ZAHARNA, Primary Examiner

F. A. SPEAR, JR., Assistant Examiner

U.S. Cl. X.R.

210—33, 140, 189, 268; 23—338

UNITED STATES PATENT OFFICE
CERTIFICATE OF CORRECTION

Patent No. 3,565,798                    Dated February 23, 1971

Inventor(s) R. G. Barnes

It is certified that error appears in the above-identified patent and that said Letters Patent are hereby corrected as shown below:

Column 3, line 22, "tthrough" should be --through--; and line 23, "its" should be --is--. Column 4, line 18, "of" should be --or--. Column 5, line 42, "s" should be --as--. Column 6, line 15, "out" should be --over--; and line 42, "79" should be --78--.

Signed and sealed this 26th day of October 1971.

(SEAL)
Attest:

EDWARD M. FLETCHER, JR.             ROBERT GOTTSCHALK
Attesting Officer                    Acting Commissioner of Patents